Sept. 15, 1936. L. A. BRIGEL 2,054,239
COFFEE GRINDER
Filed July 5, 1932 3 Sheets-Sheet 1
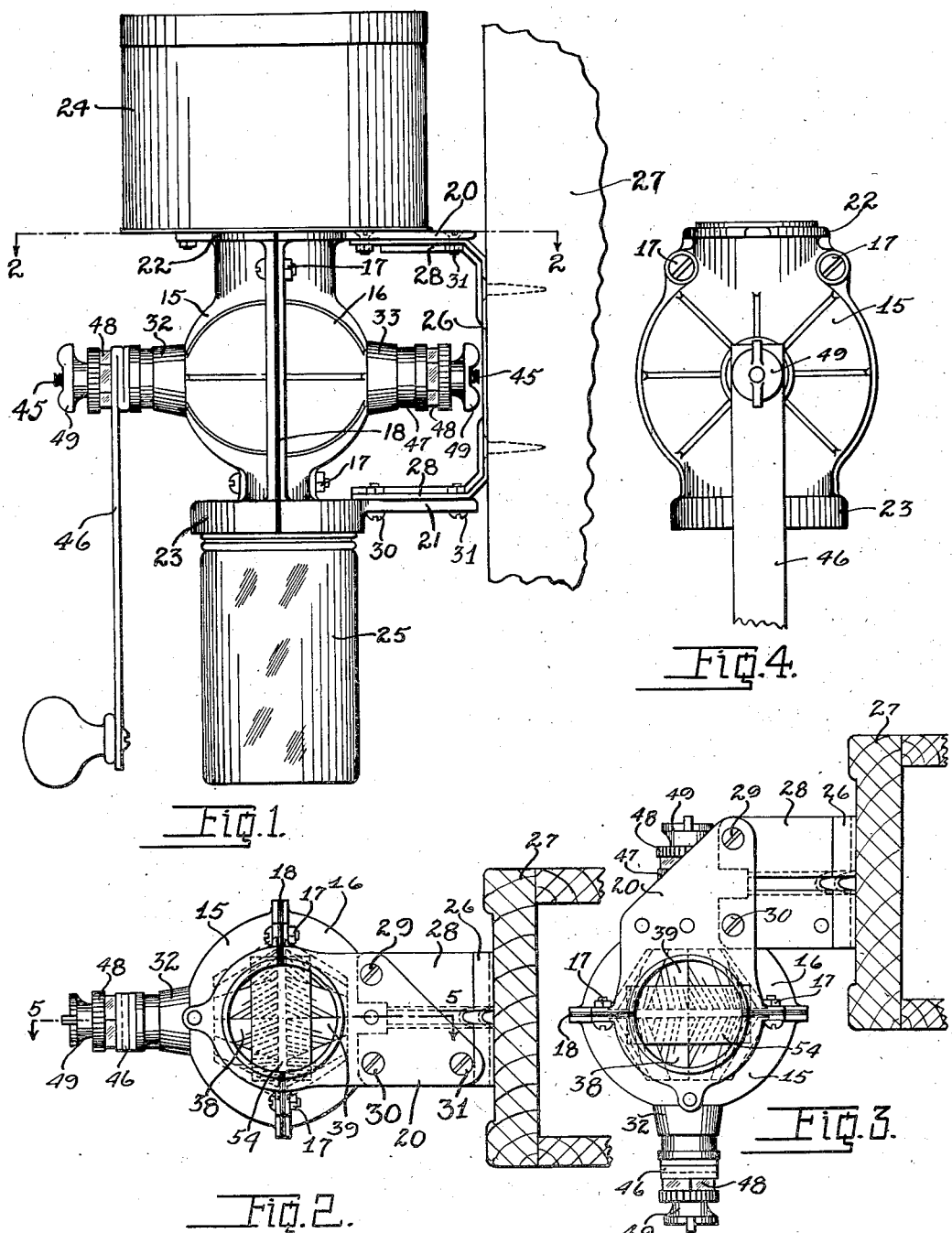
INVENTOR
LEO A. BRIGEL
BY
Joseph A. Rave
ATTORNEY Sept. 15, 1936.     L. A. BRIGEL     2,054,239
COFFEE GRINDER
Filed July 5, 1932     3 Sheets-Sheet 2
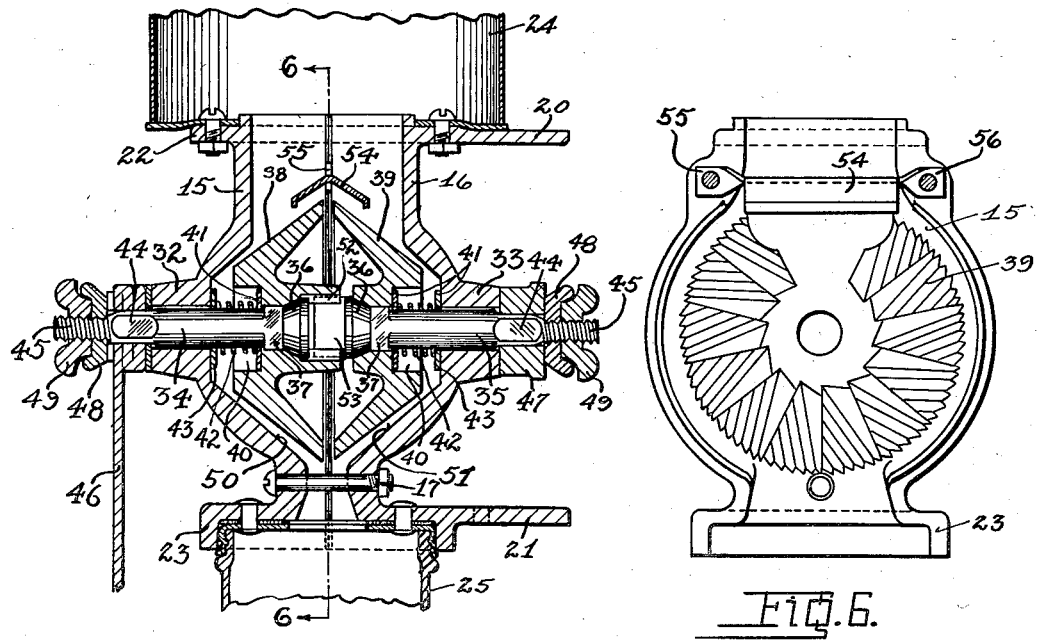
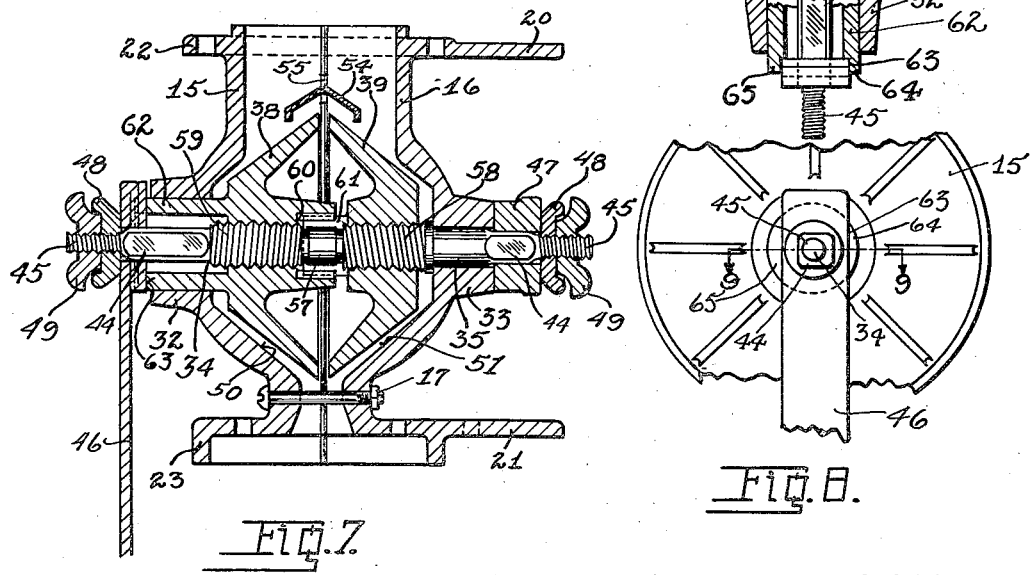
INVENTOR
LEO A. BRIGEL
BY Joseph A. Rave
ATTORNEY Sept. 15, 1936.  L. A. BRIGEL  2,054,239
COFFEE GRINDER
Filed July 5, 1932  3 Sheets-Sheet 3
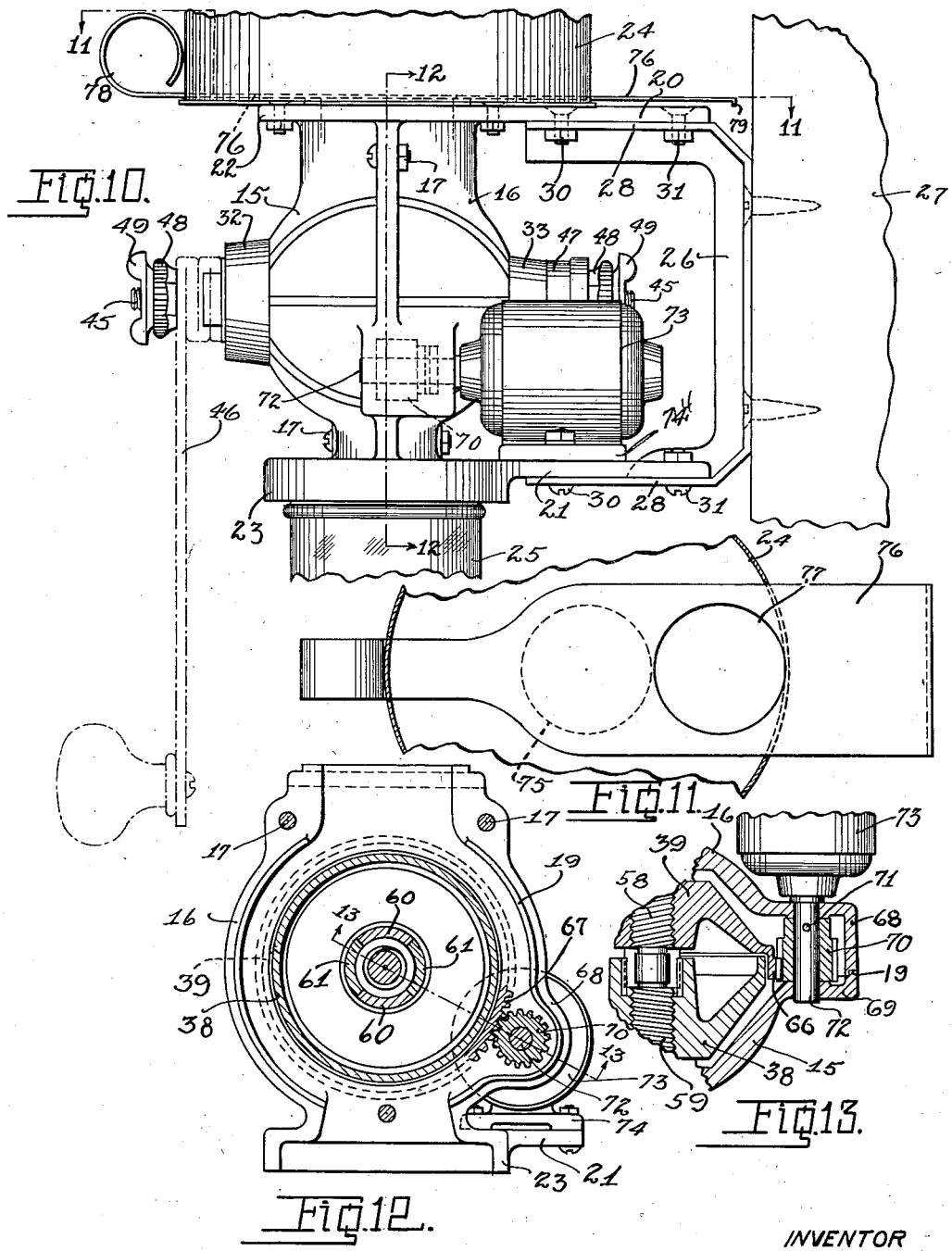
INVENTOR
LEO A. BRIGEL
BY Joseph A. Rave
ATTORNEY Patented Sept. 15, 1936

2,054,239

UNITED STATES PATENT OFFICE 2,054,239

COFFEE GRINDER

Leo A. Brigel, Cheviot, Ohio

Application July 5, 1932, Serial No. 620,889

3 Claims. (Cl. 83—18)

This invention relates to improvements in coffee grinders or coffee mills.

An object of the invention is the provision of an improved simplified coffee grinder or coffee mill for reducing the whole bean to ground coffee as used for the making of the coffee beverage.

Another object of the invention is the provision of a coffee mill of the dual type or a coffee mill having a pair of oppositely operating mills or cutters for simultaneously grinding the whole coffee bean.

Another object of the invention is the provision of a coffee mill as above described which may be either manually or power operated either being utilized at will.

A further object of the invention is the provision of a coffee mill as above described that is simple in construction yet thoroughly practical and desirable.

This invention has for its further objects the provisions of improved means for adjusting the cutters either simultaneously or individually; improved support or mounting whereby the device may be utilized in difficult or out of the way places and be readily positioned for use on different sides of its mounting; and to provide a coffee mill that readily lends itself to advertising purposes wtihout sacrificing its utility or cheapening its manufacture.

Other objects and advantages of the present invention should be readily apparent by reference to the following specification considered in conjunction with the accompanying drawings illustrating a preferred embodiment of the invention, and it is to be understood that any modification may be made in the exact structural details there shown and described within the scope of the appended claims without departing from or exceeding the spirit of the invention.

In the drawings:

Figure 1 is a side elevation of the improved coffee mill mounted in position.

Figure 2 is a top plan view of the mill proper with the whole coffee bean container removed as seen from line 2—2 on Figure 1.

Figure 3 is a top plan view of the mechanism shown in Figure 2 but swung to an adjusted position.

Figure 4 is a front elevation of the coffee mill with both the whole bean container and ground coffee receptacle removed.

Figure 5 is a fragmentary sectional view of the device as seen from line 5—5 on Figure 2.

Figure 6 is a sectional view of the coffee grinder taken at right angles to the showing in Figure 5 as seen from line 6—6 on Figure 5 and illustrating one of the cutters in elevation.

Figure 7 is a sectional view of the mill similar to that illustrated in Figure 5 showing a modification in the cutter adjusting means.

Figure 8 is a fragmentary elevational view of the mill shown in Figure 7 and illustrating the interlock of the handle with one of the cutters.

Figure 9 is a fragmentary sectional view taken on line 9—9 on Figure 8.

Figure 10 is a side elevation of a modified coffee mill illustrating the power drive to the cutters.

Figure 11 is a fragmentary horizontal view taken on line 11—11 on Figure 10.

Figure 12 is a vertical sectional view taken on line 12—12 on Figure 10.

Figure 13 is a fragmentary sectional view taken on line 13—13 on Figure 12.

Throughout the several views of the drawings similar reference characters are employed to denote the same or similar parts.

The coffee mill of the present invention comprises a front housing 15 and a rear housing 16 secured to one another by means of suitable bolts, screws, or the like 17. As shown in the drawings the bolts 17 are 3 in number, two near the upper end of the mill and one near the bottom thereof. The two housings when bolted together make a continuous casing and may have clamped between them a suitable gland 18 which prevents the escape of the ground coffee or chaff from between them. This construction may be further supplemented by overlying lips or flanges 19 as shown in Figure 13, for example. The rear housing 18 has respectively projecting from its upper and lower ends tongues 20 and 21 which are respectively integral with a radial flange 22 at the upper end of the housing and the depending flange 23 at the lower end of the housing. The radial flange 22 is adapted to be bolted to a can or container 24 in which is dumped the whole coffee bean which is to be ground. The flange 23 is adapted to be internally threaded to receive the external threads on the container 25 which receives the ground coffee as it passes from the mill.

The tongues 20 and 21 are respectively bolted or secured to arms 28 projecting from a bracket 26 secured in any desirable manner to a window or door frame 27. The arms 28, see Figures 1, 2 and 3, are relatively wide each having formed therethrough three bolt holes through which bolts 29, 30 and 31 extend. These bolts likewise extend through the tongues 20 and 21 when they are in position to clamp the mill to the bracket at which time the mill is extending substantially straight outward from the support 27. By removing the bolts 29 and 31, the bolt 30 may be used as a pivot for swinging the coffee mill to the right as seen in Figure 3 whereupon the bolt 29 is replaced to secure the mill in position parallel with the support 27. This pivoting or swinging of the mill exposes the rear thereof so that the cutter can be adjusted or the device taken apart for cleaning purposes and the like.

As shown in Figure 5 the front and rear housings 15 and 16 are respectively provided with bearing portions 32 and 33 in which is respectively journaled shafts 34 and 35. Each of these shafts is provided on its inner end with a conical head portion 36 which is adjacent a square portion 37. The conical and square portions 36 and 37 of the shafts are respectively received in correspondingly shaped openings and seats formed in the mills or cutters 38 and 39. Each of the cutters is provided in its outer surface with a counter-bore 40 which forms a seat at the base thereof to receive a washer 41. Surrounding the shafts and contacting with the washers 41 are springs 42 abutting on their other ends with washers 43 lying against the inner surface of the housings 15 and 16. The washers 43 closely engaged with the shafts 34 and 35 prevent escape of ground coffee or chaff from between the shafts and the bearings of the housings. At the outer ends of the shafts 34 and 35 they are each provided with an angular cross sectioned portion 44 from each of which extends a threaded portion 45.

As seen in Figure 5 the square portion 44 of the shaft 34 is received in a hole or bore of a similar configuration formed in the upper end of a handle 46 while the similar square portion 44 of the shaft 35 receives a collar or filler 47. The filler 47 is of a width substantially equal to the width of the bored portion of the handle 46 so that the shafts may be reversed from the position shown in Figure 5 and still receive the handle for the operation of the mill. For locking the handle and collar to its respective shaft the threaded portion 45 has mounted thereon the draw up or adjusting nuts 48 and the lock nuts 49, the former adjusting the positions of the cutters and their shafts and the latter locking them in adjusted positions.

The housing sections 15 and 16 are each respectively provided with a cooperating grinding surface 50 and 51 for cooperation with the oppositely milled surfaces of the cutters 38 and 39. In order to vary the separation between the housing grinding faces 50 and 51 and the cutting faces of the cutters it is only necessary to loosen the locknuts 48 and draw up or retract the nuts 49 to thereby compress or release the springs 42 whereupon the positions of the cutters and the shafts are varied. After the cutters have been adjusted to the desired position the locknuts 49 are screwed home thereby preventing any further or inadverent movement of the parts. When locked in adjusted position the springs 42 prevent shifting of the cutters relative to the shafts and prevent the cocking or canting of the cutters as well as a movement of the cutters towards their operating faces which would be the case if the cutters were merely loose on their shafts and not held against their conical heads.

In order to drive the two shafts simultaneously they are respectively provided with lugs or ears 52 and a tongue 53 interfitting with one another so that any motion imparted to one or the other shafts will through this connection rotate the other. This coupling of the shafts may be conveniently termed a sliding key connection which will not interfere with the adjustment of the shafts 34 and 35 toward and from one another.

As will be noted from Figures 2 and 3 the cutter teeth on the cutters are formed to extend in opposite directions so that each cutter will grind the material presented to it as they are rotated in the same direction.

In order to equally divide the coffee as it passes from the can or container 24 equally to the two cutters there is provided a shed or divider 54. This shed 54, see Figure 6, has projecting from each side thereof an ear 55 and 56 each of which is formed with a perforation therein to receive the housing attaching bolts 17, to thereby secure the shed in the proper position interiorly of the housing. From this it will be noted that no additional fastening or securing means is needed but that the two clamping bolts 17 are employed to do double duty namely to position the shed as well as securing the housing sections to one another.

The description thus far has dealt with the independent adjustment of the cutters and shafts 34 and 35 toward and from one another although the cutters may be simultaneously adjusted. This mechanism may conveniently take the form of a single shaft having formed at its central portion a plane collar 57 on each side of which is respectively cut right and left hand threads 58 and 59 of the same pitch and each received in correspondingly threaded perforations formed centrally of the cutters 38 and 39. In order to simultaneously drive the cutters in this instance the cutter 38 is provided with lugs 60 receiving tongues 61 projecting from the cutter 39. This construction likewise in effect forms a sliding key so that rotation of one of the cutters rotates the other. In this construction rotation can not be imparted solely to the shaft as this would cause the cutters, due to the friction or binding between them and the coffee beans, to approach or recede from one another. The cutter 38 is therefore provided with a large sleeve-like portion 62 which extends through and beyond the journal 32 of the housing 15 where it is provided with a slot 63 forming lugs 64 and 65 on opposite sides thereof. The handle 46 in this case is received in the slot 63 and flanked on each side by the lugs 64 and 65. The handle however is also formed with an angular cross sectioned bore or opening receiving the correspondingly cross sectioned portion 44 of the shaft so that the shaft and cutters are rotated as a unit. In order to adjust the cutters the nuts 48 and 49 on the handle side of the shaft are removed whereupon the shaft is rotated either to the right or left for thereby simultaneously causing the cutters to advance toward or recede from one another.

In the mechanism shown in Figures 10 to 13 inclusive a power driven mechanism and a manual actuating mechanism are shown either of which may be used at will or as necessity dictates for rotating the cutters. This mechanism contemplates the forming of a flange 66 on one of the cutters, cutter 39 for example, which overlies the adjacent edge of the cutter 38. Formed circumferentially and exteriorly of the flange 66 are gear teeth of the spur gear type but it is to be understood that any other type of gear teeth may be as readily formed thereon requiring only a change in the mating gear. The housing 15 and 16 are provided in one portion thereof with an extending guard or housing 68 and 69 for providing an enclosure for a relatively wide pinion 70 meshed with the gear teeth 67. The pinion 70 is pinned or otherwise secured as at 71 to the shaft 72 extending from the motor or prime mover 73. This motor 73 has the usual base 74 which rests on the lower tongue 21 and lower arm 28 of the bracket to which it is suitably secured. This is clearly shown in Figure 10 of the drawings.

In this mechanism the motive power is acting directly on one of the cutters which is operatively associated with the other cutter by either of the connections above described so that rotation of one of the cutters will simultaneously effect rotation of the other. By the use of the elongated pinion 70 the cutter 39 may be axially adjusted relative to its shaft without disengaging the gear teeth 67. As frequently occurs the electric motive power fails whereupon a grinder operated solely by this activating source is useless wherefore the handle 46 is furnished with the device and may be readily attached to the cutter or shaft as above described for actuating said cutters.

In the use of this mechanism whether of the manually operated type or the power actuated mechanism it is contemplated that the device will be utilized as an advertising medium for which purpose the container or can 24 is or may be provided with the distributor or coffee roaster's usual advertisement or label. In other words when the device is first distributed to the user it will have secured to the radial flange 22 the normal coffee container or can, which can be readily replaced by similar cans subsequently purchased from the coffee distributor or roaster.

In order to control the amount of whole coffee beans discharged from the can 24 into the coffee mill the cans are provided centrally thereof with an opening 75 adapted to substantially register with the center of the opening in the top of the mill. To close off the flow of the coffee through the opening 75 the can is provided with a sliding shutter 76 being formed therethrough with a passage 77 adapted to be brought into registry with the opening 75 of the can and to close off the opening when out of registry therewith. To conveniently actuate the shutter it is formed on its forward end with a finger piece 78 which also serves as a stop to limit the rearward shifting of the shutter and to align the shutter opening 77 with the can opening 75. The rear of the shutter is provided with a down turned flange 79 engaging the outer periphery of the can. This flange 78 also acting as a stop to limit the forward moving of the shutter and to prevent disassociation of the shutter and can.

What is claimed is:

1. In a device of the class described the combination of a housing having a bore in each side thereof in axial alignment with one another and forming journals, a shaft within each journal and each shaft having one end within the housing and adjacent one another and each having its other ends outside the housing, the shafts having on their inner adjacent ends a conical head, a cutter surrounding each shaft and contacting with its conical head, means on the outer ends of each shaft for adjusting the position thereof and its cutter relative to the housing, yielding means surrounding each shaft and abutting on opposite ends with the housing and cutter for holding said cutter against its conical head and for positioning the shaft relative to the housing in accordance with the adjustment of the shaft's adjusting means, and means for connecting the shafts for simultaneous rotation.

2. In a device of the class described the combination of a housing having a bore in each side thereof in axial alignment with one another and forming journals, a shaft within each journal and each shaft having one end within the housing and adjacent one another and each having its other ends outside the housing, the shafts having on their inner adjacent ends a conical head, a cutter surrounding each shaft and contacting with its conical head, means on the outer ends of each shaft for adjusting the position thereof and its cutter relative to the housing, yielding means surrounding each shaft and abutting on opposite ends with the housing and cutter for holding said cutter against its conical head and for positioning the shaft relative to the housing in accordance with the adjustment of the shaft's adjusting means, and means for connecting the shafts for simultaneous rotation, said shaft adjusting means comprising threads on the outer projecting ends of said shafts, and a pair of thumb nuts on each threaded end of the shafts, one for adjusting the position of the shaft and the other for locking the adjusting nut against inadvertent movement.

3. In a device of the class described the combination of a housing having a bore in each side thereof in axial alignment with one another and forming journals, a shaft within each journal and each shaft having one end within the housing and adjacent one another and each having its other ends outside the housing, the shafts having on their inner adjacent ends a conical head, a cutter surrounding each shaft and contacting with its conical head, means on the outer ends of each shaft for adjusting the position thereof and its cutter relative to the housing, yielding means surrounding each shaft and abutting on opposite ends with the housing and cutter for holding said cutter against its conical head and for positioning the shaft relaitve to the housing in accordance with the adjustment of the shaft's adjusting means, and means for connecting the shafts for simultaneous rotation, including a sliding connection between one cutter and an extension of the conical head of the other cutter shaft, and a manually operable lever attached to one of the shafts for furnishing the motive power for rotating said cutters.

LEO A. BRIGEL.